(12) United States Patent
Johnson et al.

(10) Patent No.: US 9,745,956 B2
(45) Date of Patent: Aug. 29, 2017

(54) SPAR CAP FOR A WIND TURBINE ROTOR BLADE

(71) Applicant: General Electric Company, Schenectady, NY (US)

(72) Inventors: Stephen Bertram Johnson, Greenville, SC (US); Christopher Daniel Caruso, Greenville, SC (US)

(73) Assignee: General Electric Company, Schenectady, NY (US)

( * ) Notice: Subject to any disclaimer, the term of this patent is extended or adjusted under 35 U.S.C. 154(b) by 338 days.

(21) Appl. No.: 14/565,510

(22) Filed: Dec. 10, 2014

(65) Prior Publication Data

US 2016/0169195 A1 Jun. 16, 2016

(51) Int. Cl.
*F03D 1/06* (2006.01)
*F03D 13/10* (2016.01)

(52) U.S. Cl.
CPC ......... *F03D 1/0683* (2013.01); *F03D 1/0658* (2013.01); *F03D 1/0675* (2013.01); *F03D 13/10* (2016.05); *Y02E 10/721* (2013.01)

(58) Field of Classification Search
CPC . F03D 1/001; F03D 1/06; F03D 1/065; F03D 1/0633; F03D 1/0658; F03D 1/0675; F03D 1/0683; F03D 1/0641; Y02E 10/721
See application file for complete search history.

(56) References Cited

U.S. PATENT DOCUMENTS

| | | | |
|---|---|---|---|
| 4,915,590 A | 4/1990 | Eckland et al. | |
| 5,660,527 A | 8/1997 | Deering et al. | |
| 6,443,701 B1 | 9/2002 | Mühlbauer | |
| 7,163,378 B2 | 1/2007 | Kildegaard | |
| 7,517,194 B2 | 4/2009 | Doorenspleet et al. | |
| 7,530,168 B2 | 5/2009 | Sorensen et al. | |
| 7,891,947 B2 * | 2/2011 | Chen | F03D 1/0675 416/225 |
| 7,966,726 B2 | 6/2011 | Schibsbye | |

(Continued)

FOREIGN PATENT DOCUMENTS

EP 1 956 235 A1 8/2008
JP 2003-293935 10/2003

(Continued)

OTHER PUBLICATIONS

European Search Report and Opinion issued in connection with corresponding EP Application No. 15197032.4 on May 13, 2016.

*Primary Examiner* — Dwayne J White
*Assistant Examiner* — Sang K Kim
(74) *Attorney, Agent, or Firm* — Dority & Manning, P.A.

(57) ABSTRACT

A rotor blade of a wind turbine having a pultruded spar cap is disclosed. The rotor blade includes a blade root and a blade tip. The blade root includes at least one root insert. The rotor blade also includes at least one spar cap constructed of a plurality of pultruded members grouped together to form one or more layers from the blade tip towards the blade root. Further, the pultruded members separate into one or more pultruded member bundles as the spar cap approaches the blade root. The pultruded member bundles fit within the root insert, along with the blade bolts, such that compression and tension loads of the rotor blade are transferred through the pultruded members.

16 Claims, 8 Drawing Sheets

(56) References Cited

U.S. PATENT DOCUMENTS

| | | |
|---|---|---|
| 8,025,485 B2 | 9/2011 | Jacobsen |
| 8,066,490 B2 | 11/2011 | Babu et al. |
| 8,105,040 B2 | 1/2012 | Vronsky et al. |
| 8,186,960 B2 | 5/2012 | Dawson et al. |
| 8,382,440 B2 * | 2/2013 | Baker .................. F03D 1/0675 416/226 |
| 2008/0206059 A1 | 8/2008 | Hancock et al. |
| 2009/0196756 A1 | 8/2009 | Althoff |
| 2010/0084079 A1 | 4/2010 | Hayden et al. |
| 2010/0290912 A1 | 11/2010 | Sorensen |
| 2011/0044817 A1 | 2/2011 | Bendel et al. |
| 2012/0027609 A1 * | 2/2012 | Ogde ...................... B29C 70/86 416/226 |
| 2012/0207607 A1 | 8/2012 | Mironov |
| 2013/0209257 A1 | 8/2013 | Feigl |
| 2014/0030096 A1 * | 1/2014 | Dahl ....................... B29C 70/86 416/217 |
| 2014/0178205 A1 * | 6/2014 | Nanukuttan ............ B23P 11/00 416/241 R |
| 2015/0292477 A1 * | 10/2015 | Kratmann ............. F03D 1/0633 416/229 R |
| 2016/0341177 A1 * | 11/2016 | Bech ....................... F03D 1/065 |

FOREIGN PATENT DOCUMENTS

| | | |
|---|---|---|
| WO | WO 03/082551 A1 | 10/2003 |
| WO | WO 2009/085041 A1 | 7/2009 |
| WO | WO 2010/149806 A1 | 12/2010 |
| WO | 2013084390 A1 | 6/2013 |

* cited by examiner

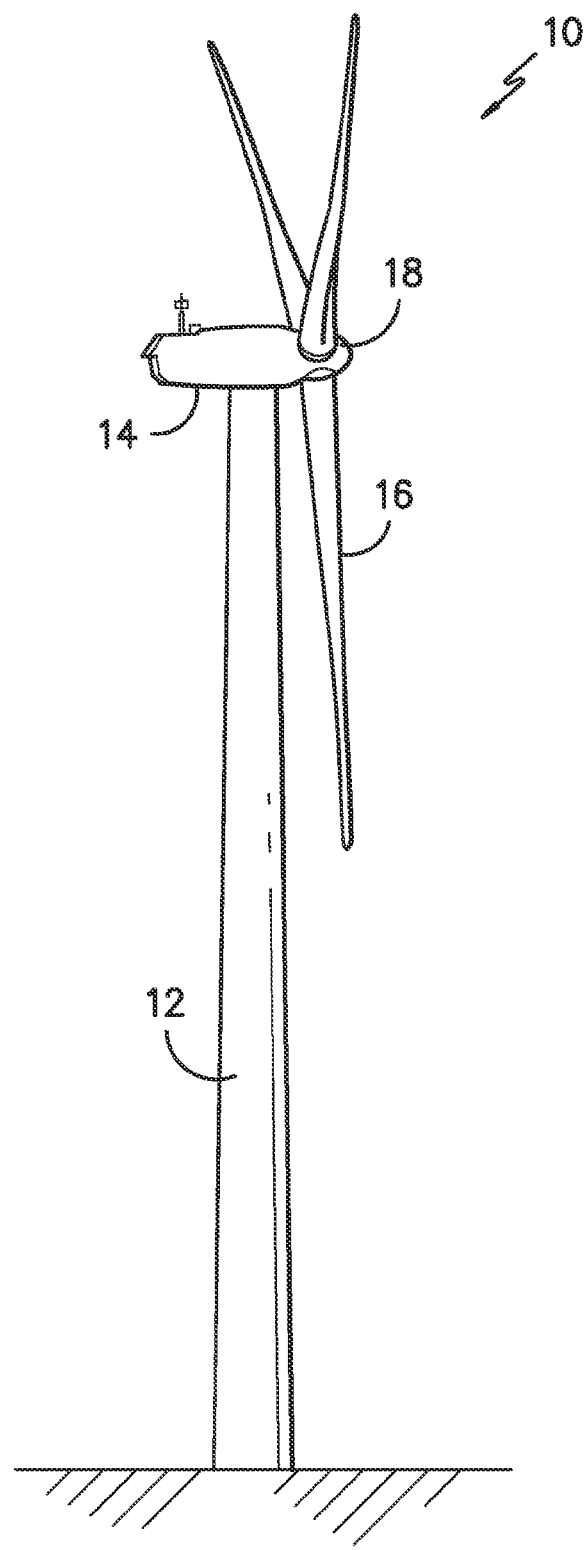
FIG. -1-

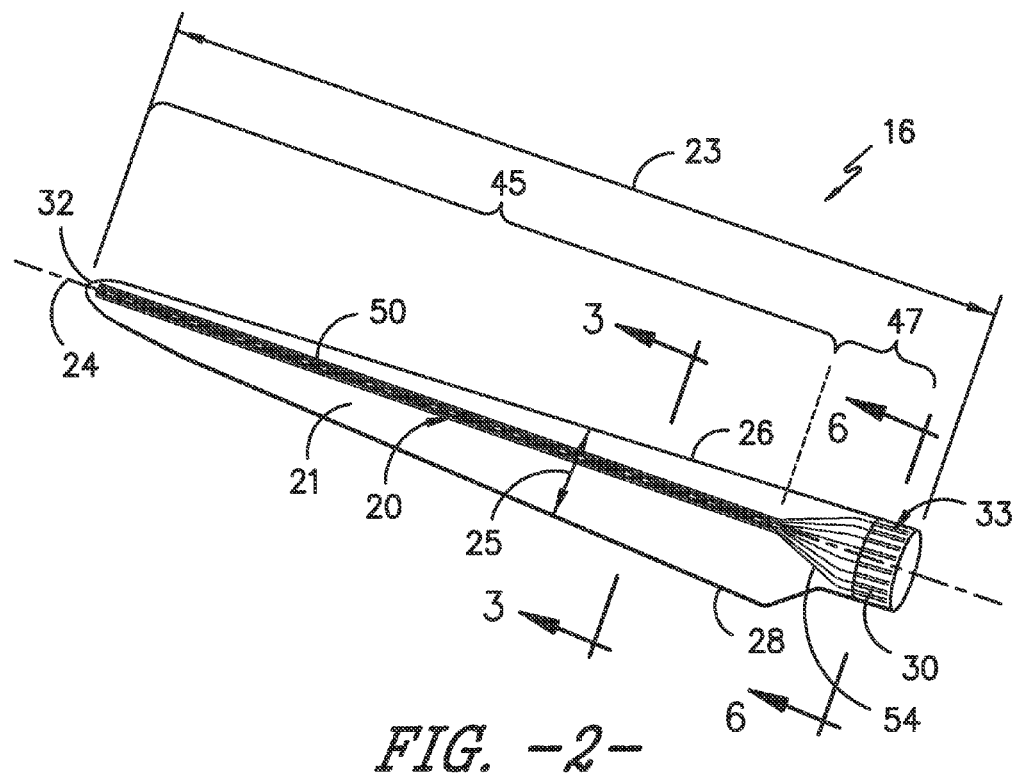
FIG. -2-
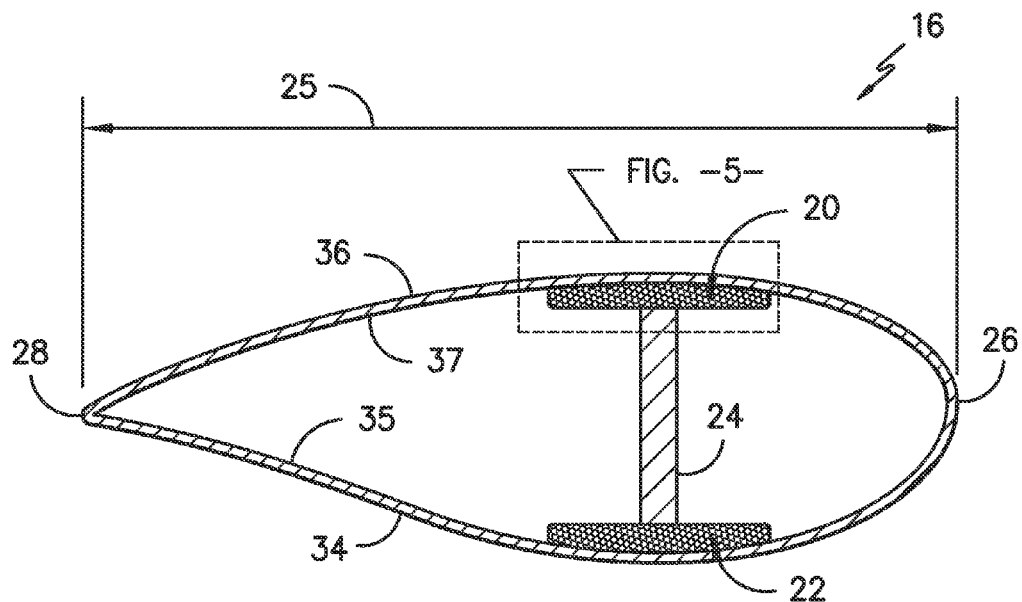
FIG. -3-

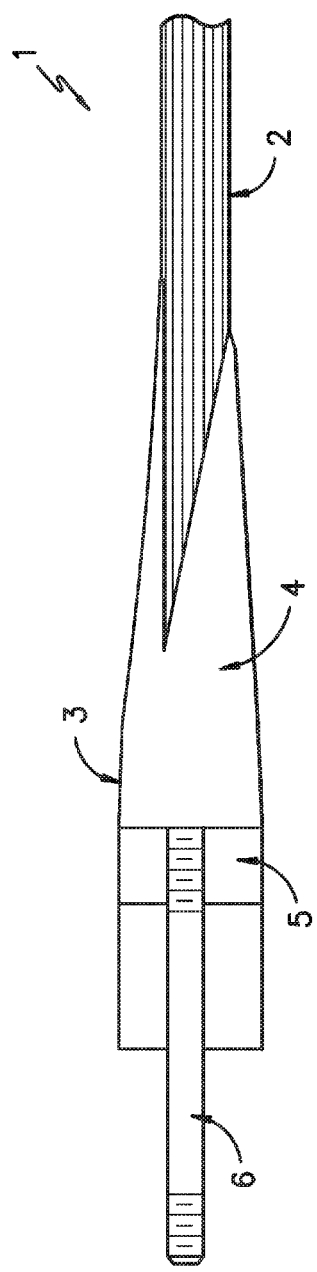
FIG. -4-
PRIOR ART
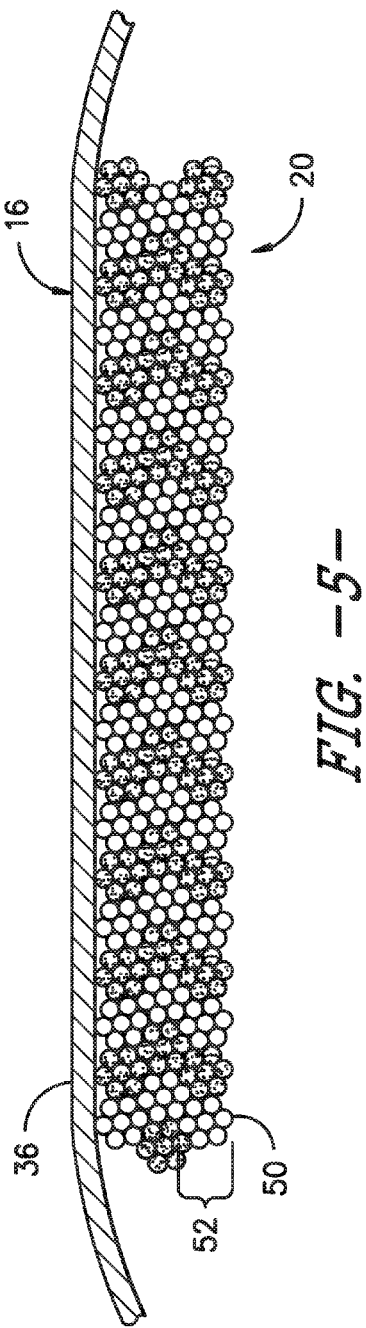
FIG. -5-

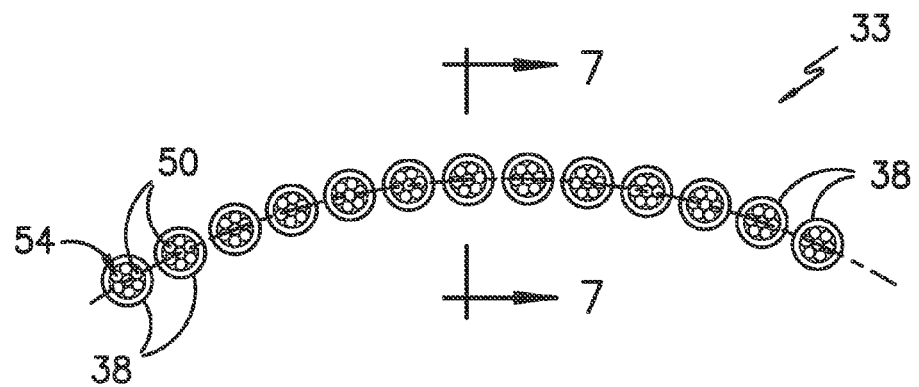
FIG. -6-
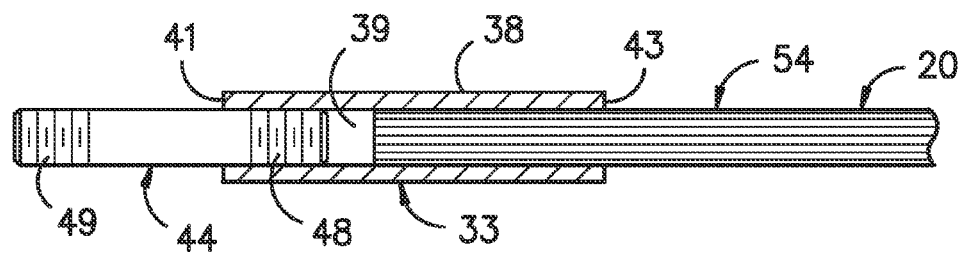
FIG. -7-
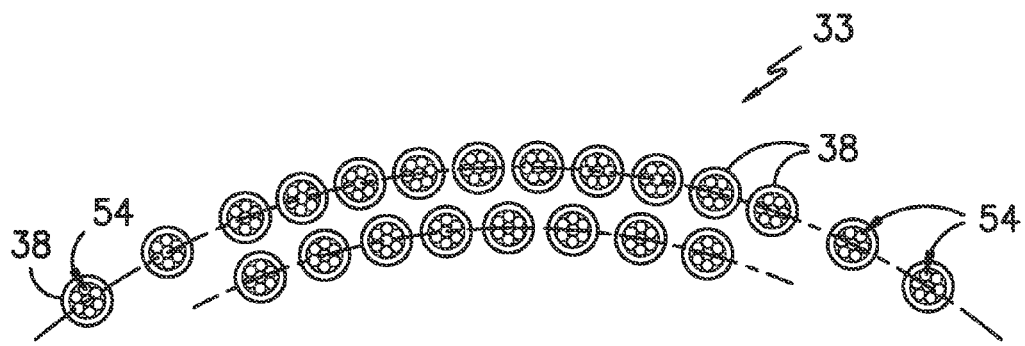
FIG. -8-

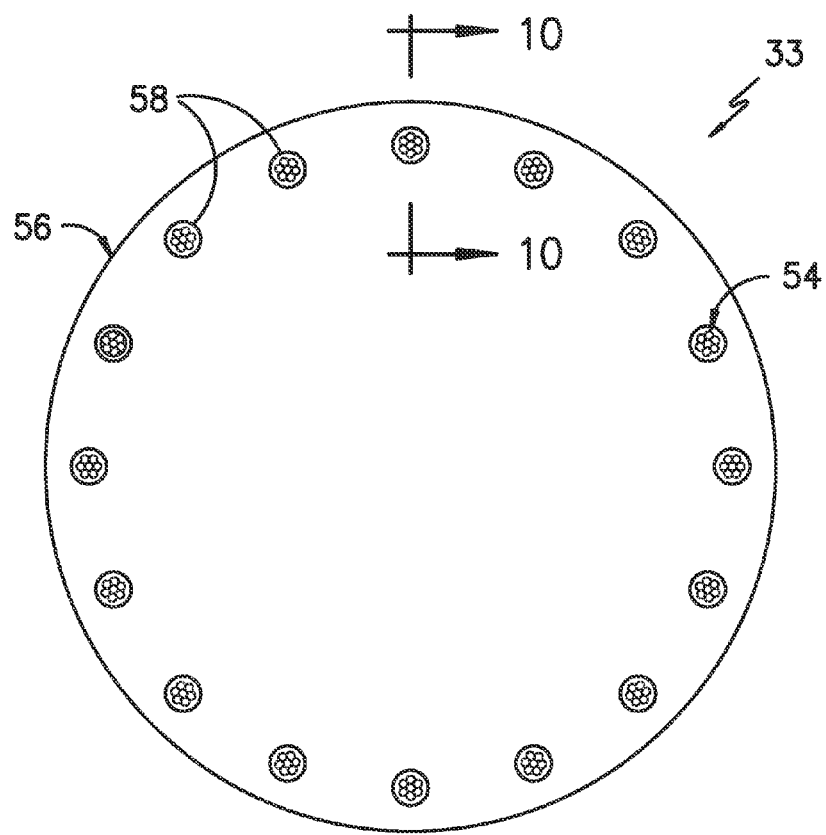
FIG. -9-
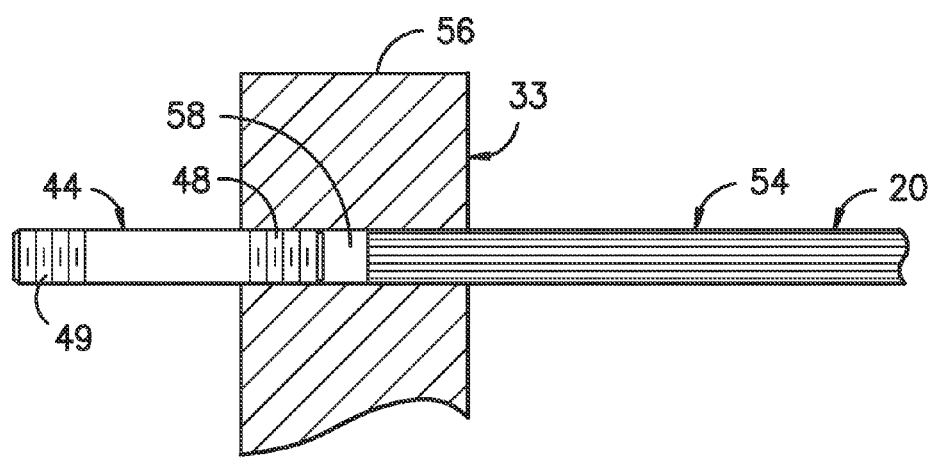
FIG. -10-

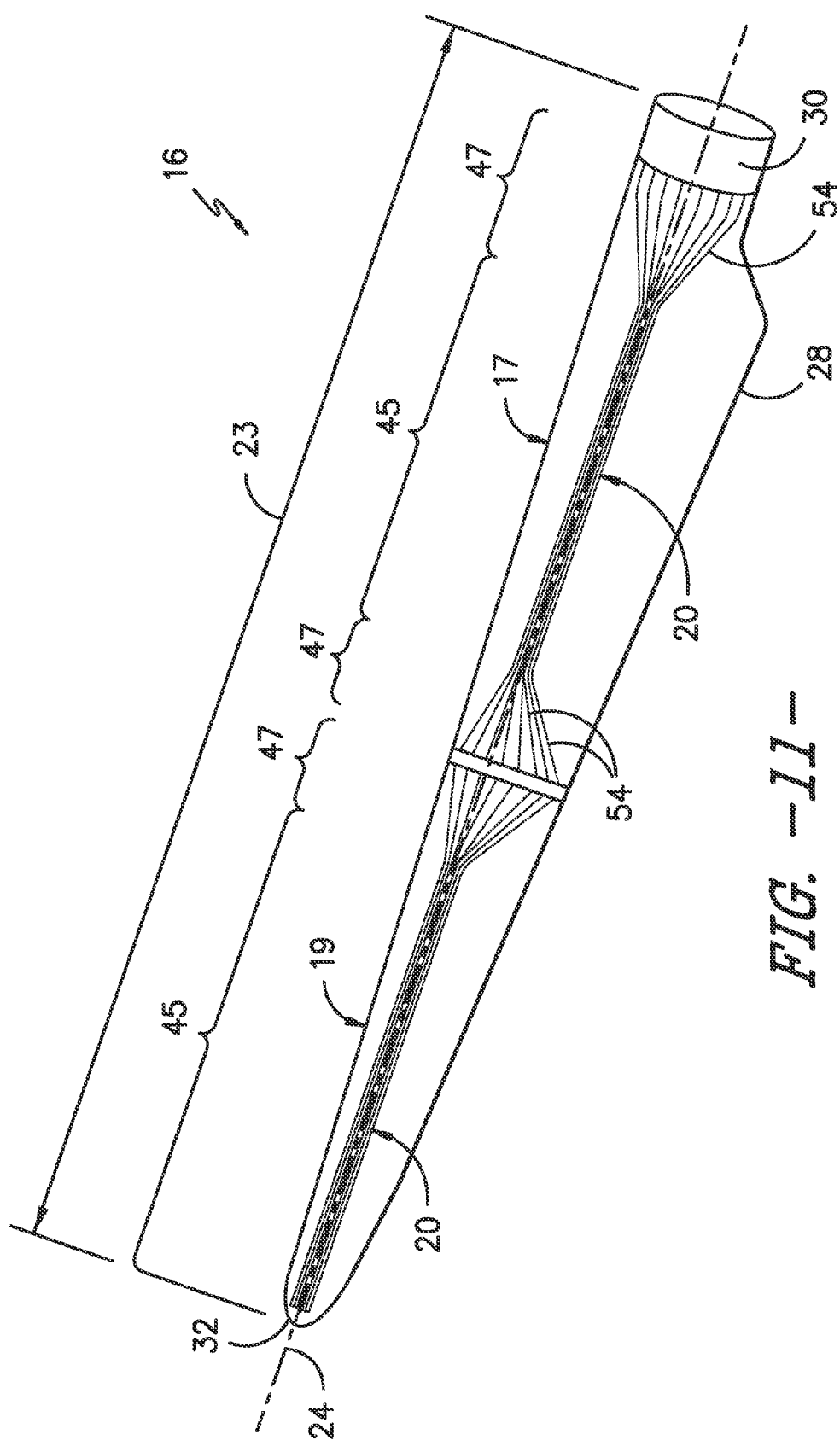
FIG. -11-

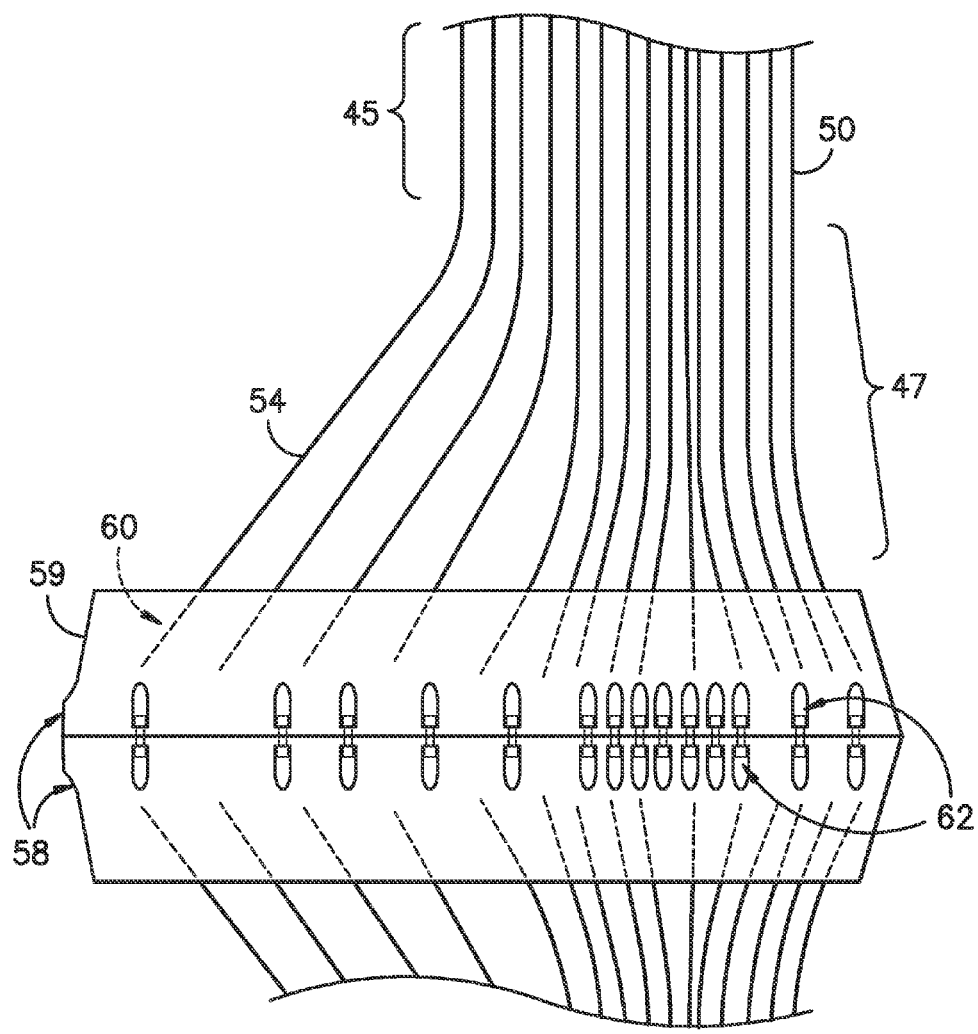
FIG. -12-
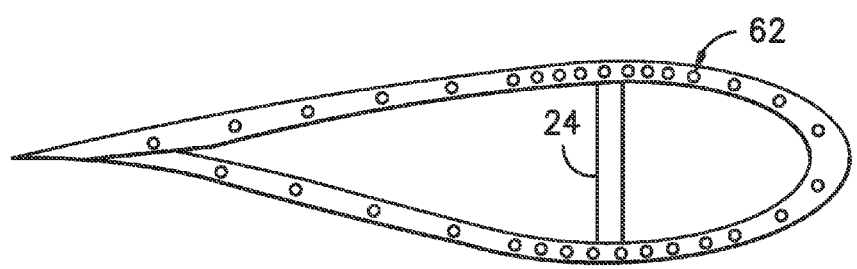
FIG. -13-

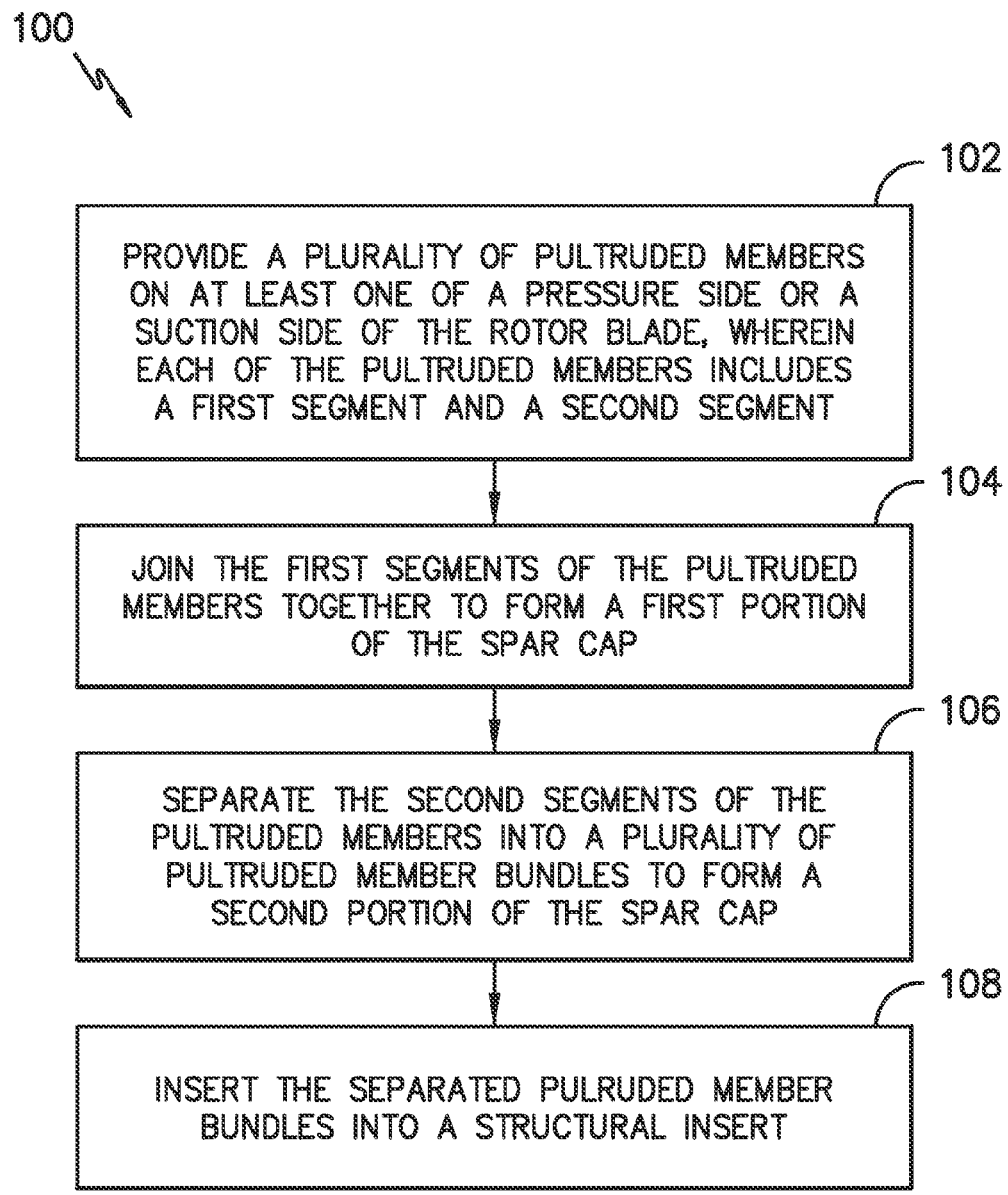
FIG. -14-

SPAR CAP FOR A WIND TURBINE ROTOR BLADE

FIELD OF THE INVENTION

The present subject matter relates generally to rotor blades of a wind turbine and, more particularly, to spar caps for wind turbine rotor blades.

BACKGROUND OF THE INVENTION

Wind power is considered one of the cleanest, most environmentally friendly energy sources presently available, and wind turbines have gained increased attention in this regard. A modern wind turbine typically includes a tower, a generator, a gearbox, a nacelle, and one or more rotor blades. The rotor blades capture kinetic energy from wind using known foil principles and transmit the kinetic energy through rotational energy to turn a shaft coupling the rotor blades to a gearbox, or if a gearbox is not used, directly to the generator. The generator then converts the mechanical energy to electrical energy that may be deployed to a utility grid.

Wind turbine rotor blades generally include a body shell formed by two shell halves of a composite laminate material. The shell halves are generally manufactured using molding processes and then coupled together along the corresponding edges of the rotor blade. In general, the body shell is relatively lightweight and has structural properties (e.g., stiffness, buckling resistance and strength) which are not configured to withstand the bending moments and other loads exerted on the rotor blade during operation. In addition, wind turbine blades are becoming increasingly longer in order to produce more power. As a result, the blades must be stiffer and thus heavier so as to mitigate loads on the rotor.

To increase the stiffness, buckling resistance and strength of the rotor blade, the body shell is typically reinforced using one or more structural components (e.g. opposing spar caps with a shear web configured therebetween) that engage the inner surfaces of the shell halves. The spar caps are typically constructed fiber laminate composites that are tapered and blended to a very thin section as the spar caps approach the blade root of the rotor blade. For example, as shown in FIG. 4, a partial, cross-sectional view of a traditional spar cap 2 near a blade root 3 of a rotor blade 1 is illustrated. As shown, the spar cap 2 is tapered and blended to a very thin section as the spar cap 2 approaches the blade root 3 of the rotor blade 1. In addition, the blade root 3 is thickened to form the blade root buildup section 4 that absorbs the loads fed into the root 3 by the spar cap 2. More specifically, as shown, the blade root 3 is thickened such that holes can be drilled into the root 3 for corresponding barrel nuts 5 and blade bolts 6. In additional blade designs, the blade root 3 is thickened such that metal inserts can be integrated into the blade root 3 and corresponding blade bolts 6 can be inserted therethrough. In either case, the tension loads are transferred from the spar cap 2 to the blade bolts 6 on to the root face of the rotor blade for compression loads.

Understandably, thickening the blade root adds additional weight and costs to wind turbines rotor blades. Thus, the art is continuously seeking new and improved spar caps that reduce the weight and costs associated therewith.

BRIEF DESCRIPTION OF THE INVENTION

Aspects and advantages of the invention will be set forth in part in the following description, or may be obvious from the description, or may be learned through practice of the invention.

In one aspect of the present disclosure, a rotor blade of a wind turbine is disclosed. The rotor blade includes a blade root and a blade tip. The blade root includes at least one root insert. The rotor blade also includes at least one spar cap constructed of a plurality of pre-cured composite members grouped together to form one or more layers from the blade tip towards the blade root. Further, the pre-cured composite members separate into one or more member bundles as the spar cap approaches the blade root. In addition, the member bundles fit within the root insert such that loads experienced by the spar cap are transferred directly from the spar cap to the root insert.

In one embodiment, the blade root includes one or more blade bolts configured to secure the rotor blade to a hub of the wind turbine, wherein each of the blade bolts includes a first end and an opposing, second end. In another embodiment, the root insert may be a root plate having one or more circumferentially-spaced openings. More specifically, the circumferentially-spaced openings may be configured to receive the one or more member bundles and the first ends of the blade bolts. In a further embodiment, the circumferentially-spaced openings may also include serrated teeth, threads, and/or a predetermined roughness configured to improve bonding between the member bundles and the root plate.

In alternative embodiments, the root insert may contain a plurality of hollow root members circumferentially arranged in the blade root. Further, each of the hollow root members may include an open passageway extending from a first end to a second end. Thus, in one embodiment, the first ends of the open passageways are configured to receive the first ends of the blade bolts, whereas the second ends of the open passageways are configured to receive the member bundles.

In certain embodiments, each of the hollow root members may include any suitable cross-sectional shape, including but not limited to one of the following: circular, oval, trapezoidal, triangular, rectangular, square, diamond, star, or similar. As such, each of the member bundles may have a cross-sectional shape substantially corresponding to the cross-sectional shape of the hollow root members. In additional embodiments, the open passageway may also include serrated teeth, threads, and/or a predetermined roughness configured to improve bonding of the member bundles and the hollow root members. In yet another embodiment, the root insert may also include an adhesive configured to further secure the member bundles therein.

In still further embodiments, the member bundles may be more densely spaced in the root insert in a flap-wise direction than an edge-wise direction. Alternatively, the member bundles may be more densely spaced in the root insert in edge-wise direction than the flap-wise direction.

In another aspect, the present disclosure is directed to a method of forming a spar cap of a rotor blade of a wind turbine. For example, in one embodiment, the method includes providing a plurality of pultruded members on at least one of a pressure side or a suction side of the rotor blade, wherein each of the pultruded members includes a first segment and second segment. Another step includes joining the first segments of the pultruded members together to form a first portion of the spar cap. The method also includes separating the second segments of the pultruded members into a plurality of pultruded member bundles to form a second portion of the spar cap. Still another step includes inserting the separated pultruded member bundles into a structural insert so as to transfer loads from the spar cap to the insert.

In one embodiment, the method may also include securing the rotor blade to a hub of the wind turbine via a plurality of blade bolts, wherein the structural insert may be a blade root insert. Thus, in particular embodiments, the blade root insert may be a root plate with one or more circumferentially-spaced openings such that the method further includes inserting the one or more pultruded member bundles into the one or more circumferentially-spaced openings of the root plate.

In alternative embodiments, the blade root insert may contain a plurality of hollow root members circumferentially arranged in the blade root. More specifically, each of the hollow root members may include an open passageway extending from a first end to a second end such that the method further includes inserting the blade bolts into the first ends of the open passageways and inserting the pultruded member bundles into the second ends of the open passageways.

In still another alternative embodiment, the structural insert may be a blade joint insert such that the method further includes inserting the separated pultruded member bundles into the blade joint insert so as to join a first blade segment and a second blade segment. In several embodiments, the blade joint insert may be a joint plate having one or more peripherally-spaced openings. As such, the method may further include inserting the one or more pultruded member bundles into the one or more peripherally-spaced openings of the joint plate so as to join the first blade segment and the second blade segment.

In an alternative embodiment, the blade joint insert may contain a plurality of hollow joint members circumferentially arranged at a predetermined span-wise location of the rotor blade. In certain embodiments, each of the hollow joint members includes an open passageway extending from a first end to a second end. Thus, the method also includes inserting the one or more pultruded member bundles into the open passageways so as to join the first blade segment and the second blade segment.

In various embodiments, the method also includes securing the pultruded member bundles within the structural insert by heating the structural insert and allowing the structural insert to cool around the pultruded member bundles, providing serrated teeth within the structural insert, threading the structural insert onto the pultruded member bundles, or similar.

In yet another embodiment, the present disclosure is directed to a rotor blade of a wind turbine. The rotor blade includes a first blade segment and a second blade segment secured together at a blade joint. Further, the rotor blade includes at least one spar cap configured on at least one of a pressure side or a suction side of the first or second blade segments. The spar cap is constructed of a plurality of pultruded members grouped together to form a first portion of the spar cap. Further, the pultruded members separate into one or more pultruded member bundles as the spar cap approaches the blade joint so as to form a second portion of the spar cap. The rotor blade also includes a blade joint insert configured at the blade joint and configured to receive the separated pultruded member bundles.

In another embodiment, the blade joint insert may be constructed of two or more insert members bolted together via a bolt connection.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine according to the present disclosure;

FIG. 2 illustrates a perspective view of one of the rotor blades of FIG. 1;

FIG. 3 illustrates a cross-sectional view of the rotor blade of FIG. 2 along line 3-3;

FIG. 4 illustrates a cross-sectional view of one embodiment of a blade root area according conventional construction;

FIG. 5 illustrates a detailed, cross-sectional view of the first portion of the spar cap of FIG. 2;

FIG. 6 illustrates a detailed, cross-sectional view of the second portion of the spar cap of FIG. 2 along line 6-6, particularly illustrating a second portion of the spar cap containing a plurality of pultruded member bundles;

FIG. 7 illustrates a detailed, cross-sectional view of one of the pultruded member bundles of FIG. 6 along line 7-7;

FIG. 8 illustrates a cross-sectional view of another embodiment of the second portion of the spar cap containing a plurality of pultruded member bundles according to the present disclosure;

FIG. 9 illustrates a partial, cross-sectional view of one embodiment of a blade root plate according to the present disclosure;

FIG. 10 illustrates a cross-sectional view of the blade root plate of FIG. 10 along line 10-10;

FIG. 11 illustrates a perspective view of another embodiment of a rotor blade having a pultruded spar cap according to the present disclosure;

FIG. 12 illustrates a detailed, top view of the pultruded spar cap of FIG. 11 at the blade joint;

FIG. 13 illustrates a cross-sectional end view of the embodiment of FIG. 12; and FIG. 14 illustrates a flow diagram of one embodiment of a method of forming a spar cap of a rotor blade of a wind turbine according to the present disclosure.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present subject matter is directed to a rotor blade of a wind turbine having a spar cap constructed of a plurality of pre-cured composites (e.g. pultruded members). The rotor blade includes a blade root, a blade tip, at least one structural insert, and at least one spar cap. Further, the spar cap may be constructed of a plurality of pultruded members grouped together to form one or more layers from the blade tip towards the blade root. Further, the pultruded members separate into one or more member bundles as the spar cap approaches the structural insert. Thus, the member bundles fit within the structural insert so as to transfer loads of the rotor blade through the pultruded members. Other alternative methods of manufacturing pre-cured materials are also possible. In addition, the spar cap of the present disclosure may be manufactured using un-cured composite materials as well.

As used herein, the terms "pultruded members," "pultruded composites," "pultrusions," or similar generally encompass reinforced materials (e.g. fibers or woven or braided strands) that are impregnated with a resin and pulled through a stationary die such that the resin cures or undergoes polymerization. As such, the process of manufacturing pultruded members is typically characterized by a continuous process of composite materials that produces composite parts having a constant cross-section.

The present disclosure provides many advantages not present in the prior art. For example, the rotor blades of the present disclosure can be produced using fewer materials, less manufacturing steps, and less assembly time. Therefore, the rotor blades can be manufactured at a much lower costs over previous designs. In addition, the rotor blades of the present disclosure typically have a lighter weight than previous rotor blades. The spar caps of the present disclosure may also have variable widths.

Referring now to the drawings, FIG. 1 illustrates a perspective view of a horizontal axis wind turbine 10. It should be appreciated that the wind turbine 10 may also be a vertical-axis wind turbine. As shown in the illustrated embodiment, the wind turbine 10 includes a tower 12, a nacelle 14 mounted on the tower 12, and a rotor hub 18 that is coupled to the nacelle 14. The tower 12 may be fabricated from tubular steel or other suitable material. The rotor hub 18 includes one or more rotor blades 16 coupled to and extending radially outward from the hub 18. As shown, the rotor hub 18 includes three rotor blades 16. However, in an alternative embodiment, the rotor hub 18 may include more or less than three rotor blades 16. The rotor blades 16 rotate the rotor hub 18 to enable kinetic energy to be transferred from the wind into usable mechanical energy, and subsequently, electrical energy. Specifically, the hub 18 may be rotatably coupled to an electric generator (not illustrated) positioned within the nacelle 14 for production of electrical energy.

Referring to FIGS. 2 and 3, one of the rotor blades 16 of FIG. 1 is illustrated in accordance with aspects of the present subject matter. In particular, FIG. 2 illustrates a perspective view of the rotor blade 16, whereas FIG. 3 illustrates a cross-sectional view of the rotor blade 16 along the sectional line 3-3 shown in FIG. 2. As shown, the rotor blade 16 generally includes a blade root 30 configured to be mounted or otherwise secured to the hub 18 (FIG. 1) of the wind turbine 10 and a blade tip 32 disposed opposite the blade root 30. In one embodiment, the blade root 30 is mounted to the hub 18 of the wind turbine 10 via one or more blade bolts 44 (FIG. 7).

A body shell 21 of the rotor blade 16 generally extends between the blade root 30 and the blade tip 32 along a longitudinal axis 27. The body shell 21 may generally serve as the outer casing/covering of the rotor blade 16 and may define a substantially aerodynamic profile, such as by defining a symmetrical or cambered airfoil-shaped cross-section. The body shell 21 may also define a pressure side 34 and a suction side 36 extending between leading and trailing ends 26, 28 of the rotor blade 16. Further, the rotor blade 16 may also have a span 23 defining the total length between the blade root 30 and the blade tip 32 and a chord 25 defining the total length between the leading edge 26 and the trailing edge 28. As is generally understood, the chord 25 may generally vary in length with respect to the span 23 as the rotor blade 16 extends from the blade root 30 to the blade tip 32.

In several embodiments, the body shell 21 of the rotor blade 16 may be formed as a single, unitary component. Alternatively, the body shell 21 may be formed from a plurality of shell components. For example, the body shell 21 may be manufactured from a first shell half generally defining the pressure side 34 of the rotor blade 16 and a second shell half generally defining the suction side 36 of the rotor blade 16, with such shell halves being secured to one another at the leading and trailing ends 26, 28 of the blade 16. Additionally, the body shell 21 may generally be formed from any suitable material. For instance, in one embodiment, the body shell 21 may be formed entirely from a laminate composite material, such as a carbon fiber reinforced laminate composite or a glass fiber reinforced laminate composite. Alternatively, one or more portions of the body shell 21 may be configured as a layered construction and may include a core material, formed from a lightweight material such as wood (e.g., balsa), foam (e.g., extruded polystyrene foam) or a combination of such materials, disposed between layers of laminate composite material.

Referring particularly to FIG. 3, the rotor blade 16 may also include one or more longitudinally extending structural components configured to provide increased stiffness, buckling resistance and/or strength to the rotor blade 16. For example, the rotor blade 16 may include a pair of longitudinally extending spar caps 20, 22 configured to be engaged against the opposing inner surfaces 35, 37 of the pressure and suction sides 34, 36 of the rotor blade 16, respectively. Additionally, one or more shear webs 24 may be disposed between the spar caps 20, 22 so as to form a beam-like configuration. The spar caps 20, 22 may generally be designed to control the bending stresses and/or other loads acting on the rotor blade 16 in a generally spanwise direction (a direction parallel to the span 23 of the rotor blade 16) during operation of a wind turbine 10. Similarly, the spar caps 20, 22 may also be designed to withstand the spanwise compression occurring during operation of the wind turbine 10.

Referring back to FIG. 2, the spar caps 20, 22 of the present disclosure are constructed of a plurality of pultruded members 50 grouped together to form a first portion 45 of the spar caps 20, 22. In certain embodiments, the pultruded members 50 may be formed by impregnating a plurality of fibers (e.g. glass or carbon fibers) with a resin and curing the impregnated fibers. The fibers may be impregnated with the resin using any suitable means known in the art. Further, the resin may include any suitable resin material, including but not limited to polyester, polyurethane, polybutylene terephthalate (PBT), polyethylene terephthalate (PET), vinyl ester, epoxy, or similar. Further, as shown, the pultruded members 50 separate into one or more pultruded member bundles 54 as the spar cap 20 approaches the blade root 30 so as to form a second portion 47 of the spar cap 20. In addition, as shown in FIGS. 2 and 6-8, the blade root 30 includes at least one blade root insert 33. As such, the pultruded member bundles 54 are configured to fit within the root insert 33 so as to transfer loads experienced by the spar cap 20 directly from the spar cap 20 to the root insert 33.

Referring particularly to FIGS. 5-7, detailed views of the spar cap 20 according to the present disclosure are illustrated. For example, FIG. 5 illustrates a detailed, cross-sectional view of the spar cap 20 of FIG. 3 (i.e. along line 3-3 of FIG. 2) at a location within the first portion 45 of the spar cap 20. FIG. 6 illustrates a detailed, cross-sectional view along line 6-6 of FIG. 3 (i.e. at a location within the second portion 47 of the spar cap 20). FIG. 7 illustrates a cross-sectional view along line 7-7 of FIG. 8. It should be understood that though the figures illustrate detailed views of the suction-side spar cap 20, the same features may be included, at least, for the pressure-side spar cap 22 as well.

More specifically, as shown in FIG. 5, the first portion 45 of the spar cap 20 is constructed of a plurality of pultruded members 50 grouped together to form one or more layers 52. Thus, as shown, the layers 52 may be stacked atop one another and joined together using any suitable means, for example, by vacuum infusing the members 50 together or by bonding the members 50 together via an adhesive, a semi-preg material, a pre-preg material, or similar. It should be understood that the arrangement of the pultruded members 50 as shown in FIG. 5 is given for illustrative purposes only and is not meant to be limiting. For example, in further embodiments, the spar cap 20 may be constructed of a single layer 52 rather than a plurality of layers 52 as shown.

Referring particularly to FIGS. 6 and 7, the second portion 47 of the spar cap 20 contains the separated pultruded member bundles 54. Further, each of the pultruded member bundles 54 may contain one or more pultruded members 50. For example, as shown, each bundle 54 contains seven pultruded members 50, with six pultruded members 50 placed around a central pultruded member 50. In alternative embodiments, more than seven or less than seven pultruded members 50 may form each bundle 54. Thus, the separate pultruded member bundles 54 are configured to fit within the root insert 33. More specifically, as shown, the root insert 33 contains a plurality of hollow root members 38 circumferentially arranged in the blade root 30. Further, as shown in FIG. 7, each of the hollow root members 38 includes an open passageway 39 extending from a first end 41 to a second end 43 of the hollow root member 38 with the first ends 41 of the open passageways 39 configured to receive the first ends 48 of the blade bolts 44 and the second ends 43 of the open passageways 39 configured to receive the pultruded member bundles 54.

It should be understood that the hollow root members 38 may have any suitable cross-sectional shape. For example, in particular embodiments, the cross-sectional shape of the hollow root members 38 may be circular, oval, trapezoidal, triangular, rectangular, square, diamond, star, or similar. As such, each of the pultruded member bundles 54 may have a cross-sectional shape substantially corresponding to the cross-sectional shape of one of the hollow root members 38 so as to fit therein. For example, as shown, the pultruded member bundles 54 have a substantially circular cross-sectional shape that corresponds to a substantially circular cross-sectional shape of the hollow root member 38.

In further embodiments, an inner surface of the open passageway 39 may include serrated teeth, threads, and/or a predetermined roughness configured to improve bonding between the pultruded member bundles 54 and the hollow root members 38. In addition, the hollow root members 38 may include an adhesive configured to further secure the pultruded member bundles 54 therein (i.e. within the open passageways 39).

In still further embodiments, as shown in FIG. 8, the pultruded member bundles 54 may be more densely spaced in the root insert 33 in a flap-wise direction than an edge-wise direction. Alternatively, the pultruded member bundles 54 may be more densely spaced in the root insert in edge-wise direction than the flap-wise direction.

In alternative embodiments, as shown in FIGS. 9-10, the root insert 33 may be a root plate 56, rather than a plurality of hollow root members 38. The root plate 56 may be constructed of a single piece of material and/or a plurality of sections (e.g. two halves or four quarters). In addition, as shown in FIG. 10, the root plate 56 may include one or more circumferentially-spaced openings 58 configured to receive the pultruded member bundles 54 therethrough and the first ends 48 of the blade bolts 44. In a further embodiment, like the hollow root members 38, the circumferentially-spaced openings 58 may also include serrated teeth, threads, and/or a predetermined roughness configured to improve bonding between the pultruded member bundles 54 and the root plate 56. In a further embodiment, the holes for the blade bolts 44 may be in a different location than the holes for the pultruded member bundles 54.

Referring now to FIGS. 11-13, the spar caps 20 of the present disclosure may also be beneficial in rotor blades 16 formed of more than one segment. More specifically, as shown in FIG. 11, the rotor blade 16 includes a first blade segment 17 and a second blade segment 19 secured together at a blade joint 29. Further, the rotor blade 16 includes at least one spar cap 20 configured on at least one of a pressure side or a suction side of the first or second blade segments 17, 19. As mentioned, the spar cap 20 is constructed of a plurality of pultruded members 50 grouped together to form a first portion 45 of the spar cap 20. Further, the pultruded members 50 separate into one or more pultruded member bundles 54 as the spar cap 20 approaches the blade joint 29 so as to form a second portion 47 of the spar cap 20.

The rotor blade 16 may also include a blade joint insert 58 configured at the blade joint 29 and configured to receive the separated pultruded member bundles 54. More specifically, the blade joint insert 58 may be configured with any of the features of the blade root insert 33 as described herein. For example, as shown in FIGS. 12 and 13, the blade joint insert 58 may be a joint plate 59 having one or more peripherally-spaced openings 60. Thus, the separate pultruded member bundles 54 may be inserted into the openings 60 so as to join the first and second blade segments 17, 19.

In an alternative embodiment, the blade joint insert 58 may comprise a plurality of hollow joint members peripherally arranged at a predetermined span-wise location of the rotor blade 16. Further, each of the hollow joint members may include an open passageway extending from a first end to a second end. Thus, the separate pultruded member bundles 54 may be inserted into the open passageways so as to join the first and second blade segments 17, 19.

The structural inserts (e.g. the blade root insert 33 or the blade joint insert 58) as described herein may be constructed of any suitable material so as to provide the desired structural and/or mechanical properties of the rotor blade 16. For example, in certain embodiments, the structural insert may be constructed of iron, steel, titanium, or similar. As a further embodiment, it should be understood that the insert 58 may be constructed of two or more pieces of material that can be bolted together via bolt connection 62.

It should also be understood that the pultruded members 50 as described herein may be used to construct various other rotor blade components, in addition to the spar cap 20. For example, in certain embodiments, the pultruded members 50 may be used to construct the shear web 24, a root ring, a bond cap, or any other rotor blade component that can benefit from being constructed of a pultruded parts as described herein.

The present disclosure is also directed to methods of forming a spar cap of a rotor blade of a wind turbine. For example, as shown in FIG. 14, a flow diagram of a method 100 of installing a spar cap of a rotor blade component of a wind turbine is disclosed. At 102, the method 100 includes providing a plurality of pultruded members on at least one of a pressure side or a suction side of the rotor blade. Further, each of the pultruded members includes a first segment and second segment. Another step 104 of the method 100 includes joining the first segments of the pultruded members together to form a first portion of the spar cap. The method 100 also includes separating the second segments of the pultruded members into a plurality of pultruded member bundles to form a second portion of the spar cap (step 106). Still another step 108 includes inserting the separated pultruded member bundles into a structural insert.

In another embodiment, the method 100 may also include securing the pultruded member bundles within the structural insert by heating the structural insert and allowing the structural insert to cool around the pultruded member bundles, providing serrated teeth within the structural insert, threading the structural insert onto the pultruded member bundles, or similar.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A rotor blade of a wind turbine, comprising:
    a blade root and a blade tip, the blade root comprising at least one root insert, the root insert comprising a root plate having one or more circumferentially-spaced openings; and,
    at least one spar cap comprising a plurality of pre-cured composite members grouped together to form one or more layers from the blade tip towards the blade root, wherein the pre-cured composite members separate into one or more member bundles as the spar cap approaches the blade root, the one or more circumferentially-spaced openings of the root plate configured to receive the one or more member bundles.

2. The rotor blade of claim 1, wherein the blade root further comprises one or more blade bolts configured to secure the rotor blade to a hub of the wind turbine, wherein each of the blade bolts comprises a first end and an opposing, second end.

3. The rotor blade of claim 2, wherein the one or more circumferentially-spaced openings are further configured to receive the first ends of the blade bolts.

4. The rotor blade of claim 3, wherein one or more of the circumferentially-spaced openings further comprise at least one of threads, or a predetermined roughness configured to improve bonding between the member bundles and the root plate.

5. The rotor blade of claim 1, wherein the member bundles are more densely spaced in the root insert in a flap-wise direction than an edge-wise direction.

6. A method of forming a spar cap of a rotor blade of a wind turbine, the method comprising:
    providing a plurality of pultruded members on at least one of a pressure side or a suction side of the rotor blade, each of the pultruded members comprising a first segment and second segment;
    joining the first segments of the pultruded members together to form a first portion of the spar cap;
    separating the second segments of the pultruded members into a plurality of pultruded member bundles to form a second portion of the spar cap;
    inserting the separated pultruded member bundles of the spar cap into a blade root insert of a blade root of the rotor blade, the blade root insert comprising a plurality of hollow root members circumferentially arranged in the blade root insert, each of the hollow root members comprising an open passageway extending from a first end to a second end, the pultruded member bundles being inserted into the second ends of the open passageways.

7. The method of claim 6, further comprising securing the rotor blade to a hub of the wind turbine via a plurality of blade bolts.

8. The method of claim 7, further comprising inserting the blade bolts into the first ends of the open passageways.

9. The method of claim 6, further comprising securing the pultruded member bundles within the blade root insert by at least one of: heating the blade root insert and allowing the blade root insert to cool around the pultruded member bundles or threading the blade root insert onto the pultruded member bundles.

10. A rotor blade of a wind turbine, comprising:
    a first blade segment and a second blade segment secured together at a blade joint;
    at least one spar cap configured on at least one of a pressure side or a suction side of the first or second blade segments, the spar cap comprising a plurality of pultruded members grouped together to form a first portion of the spar cap, wherein the pultruded members separate into one or more pultruded member bundles as the spar cap approaches the blade joint so as to form a second portion of the spar cap; and,
    a blade joint insert arranged at the blade joint, the blade joint insert comprising one or more peripherally-spaced openings that receive the separated pultruded member bundles to join the first blade segment and the second blade segment.

11. The rotor blade of claim 10, wherein each of the hollow root members comprise an arcuate cross-sectional shape.

12. The rotor blade of claim 11, wherein each of the one or more member bundles comprises a cross-sectional shape corresponding to the cross-sectional shape of one of the hollow root members.

13. The rotor blade of claim 10, wherein the open passageways further comprises at least one of threads, or a predetermined roughness configured to improve bonding of the member bundles and the hollow root members.

14. The rotor blade of claim 10, wherein the one or more peripherally-spaced openings of the blade joint insert are formed in at least one of a joint plate or a plurality of hollow joint members circumferentially arranged at a predetermined span-wise location of the rotor blade.

15. The rotor blade of claim 14, wherein each of the hollow joint members comprises an open passageway extending from a first end to a second end, the one or more pultruded member bundles being inserted into the open passageways so as to join the first blade segment and the second blade segment.

16. The rotor blade of claim 15, wherein the first ends of the open passageways are configured to receive first ends of the blade bolts and the second ends of the open passageways are configured to receive the one or more pultruded member bundles.

* * * * *